United States Patent
Pregniard et al.

(10) Patent No.: US 9,937,951 B2
(45) Date of Patent: Apr. 10, 2018

(54) DETERMINATION OF AN ANGULAR REFERENCE POSITION OF A POWER STEERING SYSTEM FROM RISING AND FALLING EDGES OF AN INDEX SIGNAL

(71) Applicant: JTEKT EUROPE, Irigny (FR)

(72) Inventors: Romaric Pregniard, St Symphorien d'Ozon (FR); Christophe Ravier, Saint Pierre de Chandieu (FR); Xavier Palandre, Grezieu-la-Varenne (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 15/113,392

(22) PCT Filed: Jan. 29, 2015

(86) PCT No.: PCT/FR2015/050202
§ 371 (c)(1),
(2) Date: Jul. 21, 2016

(87) PCT Pub. No.: WO2015/114256
PCT Pub. Date: Aug. 6, 2015

(65) Prior Publication Data
US 2017/0008556 A1  Jan. 12, 2017

(30) Foreign Application Priority Data

Jan. 30, 2014 (FR) .................................. 14 50752

(51) Int. Cl.
*B62D 5/04* (2006.01)
*B62D 6/00* (2006.01)
*B62D 15/02* (2006.01)

(52) U.S. Cl.
CPC ............ *B62D 5/0481* (2013.01); *B62D 6/00* (2013.01); *B62D 15/0245* (2013.01)

(58) Field of Classification Search
CPC ..... B62D 5/0481; B62D 6/00; B62D 15/0245
See application file for complete search history.

(56) References Cited

U.S. PATENT DOCUMENTS 4,674,587 A * 6/1987 Suzuki ................... B62D 6/00
180/422
4,913,250 A * 4/1990 Emori ................... B62D 6/00
180/417

(Continued)

FOREIGN PATENT DOCUMENTS

DE    10 2005 059883 A1   6/2007
EP       1 342 647 A2      9/2003

(Continued)

OTHER PUBLICATIONS

May 6, 2015 International Search Report issued in International Patent Application No. PCT/FR2015/050202.

*Primary Examiner* — Tuan C To
(74) *Attorney, Agent, or Firm* — Oliff PLC (57) ABSTRACT

A reference position in a power steering system is defined by acquiring a first edge position corresponding to a first edge of a first index pulse generated when a movable steering member passes an indexed position in a first movement direction; acquiring a second edge position corresponding to a second edge of a second index pulse generated when the movable steering member passes the same indexed position in a second movement position opposite the first movement direction; and calculating the reference position from the first edge position and the second edge position.

10 Claims, 1 Drawing Sheet

(56) References Cited

U.S. PATENT DOCUMENTS

| | | | |
|---|---|---|---|
| 4,939,654 A * | 7/1990 | Kouda | B60G 17/0185 180/400 |
| 6,329,782 B1 * | 12/2001 | Chen | B62D 5/046 318/727 |
| 6,498,451 B1 * | 12/2002 | Boules | B62D 5/0403 318/400.06 |
| 2003/0057902 A1 * | 3/2003 | Desbiolles | B62D 15/0235 318/400.38 |
| 2004/0085039 A1 * | 5/2004 | Games | H02P 6/18 318/400.39 |
| 2005/0205343 A1 * | 9/2005 | Uryu | B62D 5/0481 180/446 |
| 2006/0132338 A1 * | 6/2006 | Katakura | G01D 5/244 341/112 |
| 2008/0234897 A1 * | 9/2008 | Tsuchida | B60W 50/029 701/42 |
| 2011/0057821 A1 * | 3/2011 | Kim | G01D 5/2454 341/116 |
| 2012/0158335 A1 * | 6/2012 | Donovan | G05B 19/0423 702/79 |
| 2012/0211299 A1 * | 8/2012 | Yanai | B62D 5/046 180/446 |
| 2012/0217849 A1 * | 8/2012 | Aoki | H02P 6/18 310/68 D |
| 2013/0062138 A1 * | 3/2013 | Naitou | B62D 5/046 180/446 |
| 2015/0311838 A1 * | 10/2015 | Moule | B62D 5/0403 318/400.22 |
| 2015/0349682 A1 * | 12/2015 | Dixon | H02P 21/00 318/400.02 |

FOREIGN PATENT DOCUMENTS

| | | | | |
|---|---|---|---|---|
| EP | 1 754 648 A2 | | 2/2007 | |
| JP | 01208273 A | * | 8/1989 | |
| JP | 2011080841 A | * | 4/2011 | B62D 5/0484 |

* cited by examiner

DETERMINATION OF AN ANGULAR REFERENCE POSITION OF A POWER STEERING SYSTEM FROM RISING AND FALLING EDGES OF AN INDEX SIGNAL

BACKGROUND

The present invention concerns the general field of power steering systems, and in particular of electric power steering systems, as well as the methods for managing such power steering systems.

More particularly, it concerns the methods which allow determining the absolute position of a movable member of the steering system, for example the absolute angular position of the steering wheel, or the absolute position of the steering rack.

Indeed, this information on the absolute position of the steering wheel (or of the rack) may be necessary for carrying out various onboard functions, such as the automatic return of the steering to the midpoint, the control of the direction change indicators or of directional lights orientation, the parking assist, etc.

To this end, it is known in particular to deduce the absolute angular position of the steering wheel from, on the one hand, an absolute "mechanical" origin position, defined by factory calibration and, on the other hand, a measurement of the relative angular position of the shaft of the steering assist motor, said relative angular position measurement allowing to quantify the angular displacement of the steering wheel, and more generally the displacement of the different constitutive members of the kinematic linkage of the steering, relative to said origin position.

Advantageously, the absolute original position may correspond to the midpoint of the steering system, that is to say to the configuration in which the steering wheel (respectively the rack) is centered, that is to say it is oriented neither to the left, nor to the right.

Nonetheless, in the case of interruption of the electric power supply of the calculator which stores the information related to the original position, for example when replacing the battery, or still subsequently to a mechanical shift occurring between the assist motor and the rest of the kinematic linkage, for example during a skip of the drive belt which links the shaft of said assist motor to the pinion which meshes on the steering rack, the reference frame based on said absolute original position may be lost or distorted.

This is why it is possible to provide for means, integrated to the power steering, which allow recovering said original position.

To this end, it is known in particular to set up, within the power steering, and more particularly at the steering column which supports the steering wheel, an «index»-type sensor.

Preferably, such index is designed to mark one single reference position (index position) in the same complete revolution of the steering wheel, and more particularly, to generate a pulse when the steering column passes by a predetermined indexed angular position, which thereby constitutes an absolute mechanical reference.

Starting from the information provided by this index, it is possible, during an initial factory calibration operation (learning), to measure the deviation existing between, on the one hand, the reference angular position, which typically corresponds to the angular position occupied by the steering wheel when crossing the index and, on the other hand, the position of the selected absolute origin, which typically corresponds to the angular position occupied by this same steering wheel when the steering is in its midpoint.

In particular, the angular positions may be measured by means of any suitable sensor, and for example by means of an angular position sensor associated to the shaft of the assist motor.

Ultimately, the absolute origin of the steering mechanism may be defined as being the (algebraic) sum of the reference position (position tracked by the index) and of an «offset»-type corrective term, which corresponds to the aforementioned deviation, initially assessed by calibration.

According to this principle, it is possible at any moment, as long as the information on the reference position (index position) is known, to recover the absolute origin of the reference frame of the steering, by adding to this reference position (index position) a corrective term, which corresponds to the angular deviation (offset) initially measured during the factory calibration operation.

In practice, by combining the information, on the one hand, derived from the index and, on the other hand, from the sensor which measures the relative angular position of the shaft of the assist motor, and more particularly by identifying the relative angular position of the motor shaft at which the index pulse is detected, it is advantageously possible to re-calibrate the measurement reference frame, whenever necessary, by recovering its absolute origin.

In this manner, it is possible to assimilate again, in this re-calibrated reference frame, the relative angular position of the motor shaft to the absolute angular position of the steering wheel.

SUMMARY

Nonetheless, such a method for determining the absolute origin, which is based on the detection of a reference position by means of an index, may sometimes suffer from some inaccuracy.

Indeed, when it becomes necessary to re-calibrate the measurement reference frame, the index implementation conditions, and more generally the steering conditions, may differ from the conditions under which the calibration has been performed in the factory.

The implementation conditions of the index not being strictly reproducible, some inaccuracy affects the measurement of the reference position per se, and, consequently, the definition of the absolute origin from this reference position.

In particular, this inaccuracy may find its origin within the thermal drifts of the index, the variations in temperature tending actually to modify the width of the index pulse. More particularly, when the temperature of the sensor increases, the pulse width, and in particular the width at half height, also tends to increase, which may distort a tracking of the reference position if said tracking is based on the detection of the rising edge or of the falling edge of said pulse.

Another source of error lies in the intrinsic elasticity of the mechanical members which form the kinematic linkage which links the shaft of the assist motor to the steering column equipped with the index, or in the clearances which may exist at the links between these mechanical members.

Indeed, elastic deformations or clearances in the kinematic linkage may generate a shift between the marker attached to the assist motor and the marker attached to the index, which may impair the reliability of the correlation (which is supposed to be exact, in the assumption of a perfectly rigid kinematic linkage) between the relative angular position measured at the level of the motor shaft and the indexed absolute position detected by the index.

A thermal expansion or contraction of the steering members, and in particular of the rack, may also contribute in shifting the index.

Finally, another type of error may result from the conditions under which the passage of the steering column in front of the indexed position is carried out, the apparent position and the width of the index pulse being in particular likely to be sensitive to the instantaneous speed of rotation of the steering wheel, or still to the magnitude of the forces which are exerted on said steering wheel or on the steering rack.

Consequently, the objects of the invention aim at overcoming the aforementioned drawbacks, and proposing a new type of power steering system and a new method which allow to define rapidly, with improved accuracy and reliability, a reference position of power steering system, from which the absolute positions of the members of said power steering system are determined.

The objects of the invention are achieved by means of a method for defining a reference position of power steering system, said power steering system comprising at least one movable steering member the position of which varies based on the orientation given to the steering, said method comprising:
  a tracking step (a), during which an index pulse is generated when the movable steering member passes by a predetermined position, called «indexed position»,
  a processing step (b), during which the index pulse is analyzed in order to detect a rising edge and/or a falling edge therein,
  a characterization step (c), during which a value called «edge position», which is representative of the position occupied by the movable steering member when said edge occurs, is associated to the rising or falling edge, identified during the processing step (b),
  said method being characterized in that:
  the tracking (a), processing (b), and characterization (c) steps are repeated, on the one hand, for a first index pulse which is generated when the movable steering member crosses the indexed position in a first direction of displacement, and on the other hand, for a second index pulse which is generated when said movable steering member crosses this same indexed position in a second direction of displacement, opposite to the first direction of displacement, so as to acquire, respectively, on the one hand, a first edge position, which corresponds to a first edge generated in the first direction of displacement, and on the other hand, a second edge position, which corresponds to a second edge which is generated in the second direction of displacement and which is of the same rising or falling nature, as the first edge,
  and in that said method includes a step (d) of calculating a reference position, during which a reference position of the power steering system is calculated from the first edge position and the second edge position.

Advantageously, the inventors have actually observed that, by finding the reference position, that is to say the actual center of the indexed position, based on two edges of the same nature (for example two rising edges) corresponding to the same indexed position which is «seen», on the one hand, in a first direction of passage then, on the other hand, in a second direction of passage opposite to the first one, it is possible to significantly reduce the errors related to an estimation which was based so far on one single passage, and on one single pulse.

Indeed, by averaging the two (distinct but substantially symmetrical) perceptions of the same indexed position, as they are delivered by the two pulses which correspond to two crossings, in opposition, and more particularly in the clockwise direction then in the counterclockwise direction (or vice versa), of the same single physical angular position of the index sensor, the errors related to the first pulse are compensated by the (substantially symmetrical) errors related to the second pulse, so that, generally, on average, said errors, as well as the hysteresis phenomena, cancel each other.

Thus, the method allows overcoming the aforementioned sources of errors, and thus defining, with a high accuracy and a great reliability, an absolute reference position which corresponds to the actual physical center of the indexed position.

In other terms, the method in accordance with the invention advantageously makes the measurement of the reference position (index position) reproducible, by reducing and even eliminating the drifts and the sources of inaccuracy, regardless of the moment at which said measurement of the reference position takes place.

Thus, said method advantageously allows defining the absolute origin of the steering reference frame in a reliable and updatable manner, at any time during the life of the vehicle, based, on the one hand, on the reference position (which is updated whenever necessary by a new index pulse acquisition) and, on the other hand, on an (origin) corrective term determined initially by factory calibration as indicated hereinabove.

DETAILED DESCRIPTION OF THE DRAWINGS

Other objects, features and advantages of the invention will appear in more details upon reading the description that follows, as well as with reference to the appended drawings, provided only for an illustrative and non-restrictive purpose, among which.

DETAILED DESCRIPTION OF EMBODIMENTS

The present invention concerns a power steering system 1, as well as a method for defining a reference position $\theta_{ref}$ of power steering system, said power steering system 1 comprising at least one movable steering member 2, the position of which varies according to the orientation given to the steering system.

Figure 1:
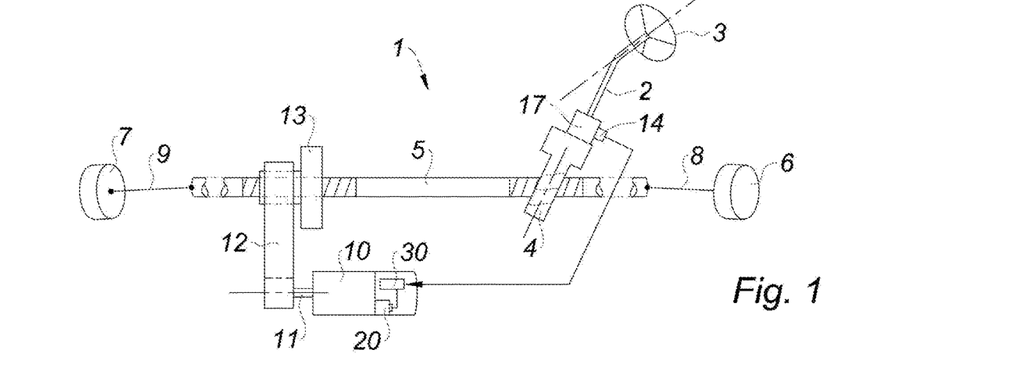
FIG. 1 illustrates, according to a schematic view, an example of power steering system in accordance with the invention.

As is illustrated in FIG. 1, the power steering system 1 according to the invention may advantageously comprise, in a manner known per se, a steering column 2, which preferably forms the movable steering member 2 within the meaning of the invention (and which may be assimilated, for convenience, to said movable member 2 in the following), said steering column 2 carrying at one of its ends a steering wheel 3, on which the driver can act in order to choose the orientation of the steering system, and at its other end a pinion 4 which preferably meshes on a rack 5, in turn guided in translation in a steering housing fastened on the body of the vehicle (not shown).

Preferably, each of the left and right ends of the rack 5 are linked to a steered wheel 6, 7 via a steering tie rod 8, 9, so that the alternating displacements of the rack 5 control the changes of orientation (in a yaw fashion) of said steered wheels 6, 7, that is to say the orientation of the steering system.

The steering system 1 also comprises a bidirectional rotation assist motor 10 whose shaft 11 is coupled to a movable member of the steering, such as the steering column 2 or the rack 5, so as to be capable to apply to said movable member 2 a driving or possibly resisting assistance force, according to predetermined assistance laws.

In a particularly preferable manner, said assist motor 10 is an electric motor, and more particularly a direct current motor.

Nonetheless, the invention might possibly apply to another type of assist motor, for example a hydraulic motor.

According to a possible variant, illustrated in FIG. 1, the assist motor 10 may be coupled to the rack 5 via a drive mechanism with a transmission belt 12 and a ball screw 13.

Nonetheless, the invention is perfectly applicable to any steering system fitted with any assist mechanism.

Thus, the steering 1 might include, for example, a dual-pinion assist mechanism, in which a drive pinion fastened to the shaft 11 of the assist motor 10 would mesh on teeth of the rack 5, at a distance from the pinion 4 operated by the steering column 2, or a single-pinion assist mechanism, in which the assist motor 10 would act directly on the steering column 2, for example via a reducer with a worm wheel and worm screw.

According to the invention, the method for defining a reference position $\theta_{ref}$ comprises a tracking step (a), during which an index pulse T1, T2 is generated when the movable steering member 2 passes by a predetermined position, called «indexed position».

Concretely, an index sensor, hereinafter called «index» 14, will be used to this end, which allows to physically track an absolute position of the movable steering member 2, in a reference frame considered as fixed and relative to which the guided displacements of said movable steering member 2 are performed, such as the reference frame associated to the body of the vehicle and/or the reference frame associated to the steering housing (wherein said steering housing is preferably fastened to said body).

Advantageously, the index pulse T1, T2 will form a pulse with non-zero width (the width will correspond, for example, to a 30-degree rotation of the steering wheel), preferably in the form of an analog signal, and for example a bell-shaped curve.

Advantageously, an index pulse T1, T2 will be generated automatically at each crossing, by the movable steering member 2, of the point (or of the sector, in particular the angular sector) corresponding to the indexed position.

Figure 2:
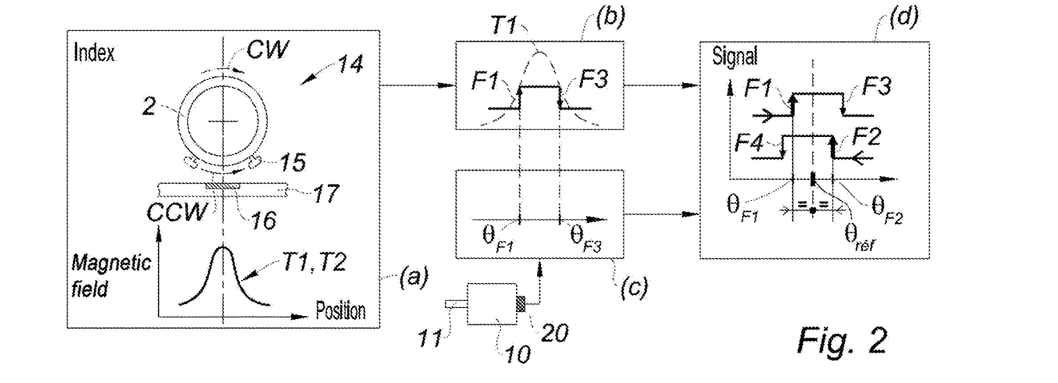
FIG. 2 illustrates a diagram of the operation of a method in accordance with the invention.

Preferably, as is illustrated in FIG. 2, it is possible to use an index 14 comprising a magnet 15, secured to the movable member 2, and intended to cooperate with a magnetic detector 16, such as a Hall-effect probe, which is, in turn, fastened to a sensor housing 17 (secured to the steering housing) relative to which the displacement of said movable member 2 is performed.

Thus, the passage of said magnet 15 in front of the magnetic detector 16, for instance at the closest distance from said magnetic detector, generates a variation of the magnetic field which passes through said detector 16, in this case the apparition of a magnetic field peak, which results into an index pulse T1, T2.

In other terms, the index pulse T1, T2 is preferably an analog pulse delivered by a magnetic index sensor.

Thus, it is possible to generate an index pulse by means of an index 14 with a relatively simple, robust, compact, and low-cost structure, and which advantageously operates without contact, and therefore without generating any wear.

Where appropriate, the index 14 might operate according to a technology other than a magnetic one, and in particular an optical one. For example, it may be possible to provide a hole or a reflecting system on the movable steering member 2, which would allow generating a light pulse, in the visible or invisible (for example infrared) spectrum, by interacting, by transmission or reflection, with an incident beam emitted by a light source secured to the sensor housing 17 (in turn secured to the steering housing). The transmitted, deflected or reflected beam will be then perceived by an optical detector, such as a photodiode or a CCD, also placed on the sensor housing 17.

According to a preferable variant, the index 14 will form a rotational sensor, tracking an indexed position which corresponds to an angular position in a rotational motion of the movable steering member 2, for example an absolute angular position in an operating revolution of the movable steering member 2, and more particularly in a revolution of the steering wheel 3.

Moreover, the movable steering member 2 will be preferably constituted by the steering column 2 which carries the steering wheel 3.

It will be then advantageously possible to generate an index pulse T1, T2 at each passage of said steering column 2 by a predetermined indexed angular position.

More particularly, according to one embodiment, the index pulse signal T1, T2 may thus be generated during the passage in rotation of the portion of the steering column 2 carrying the magnet 15 facing (closest to) the magnetic detector 16 that is carried by the sensor housing 17 in which said steering column 2 rotates under the action of the steering wheel 3 to which said steering column is secured.

Advantageously, it will be noted that placing the index 14 at the steering column will allow for a simple and compact integration of said index 14.

This being so, according to another possible variant of the invention, the index may be formed by a translational sensor.

Thus, the invention may perfectly apply by arranging the index 14 differently, for example at the rack 5, so as to detect the passage in longitudinal translation of a section of said rack 5, for example the middle (mid-length) of said rack, carrying the magnet 15, by an indexed position materialized by a magnetic detector 16 integrated to the steering housing which guides the translation of said rack 5.

In all cases, the power steering system and the index 14 will be preferably arranged so that the indexed position, tracked by the index 14, is by construction relatively close to the midpoint of the steering system.

Advantageously, such a choice allows in practice to generate an index pulse T1, T2 rapidly, shortly after unlocking the steering system and starting-up the vehicle, since low-amplitude motions of the steering wheel are then enough to cause crossing of the indexed position, and therefore generating a pulse that is exploitable to calculate a reference position.

As an indication, the indexed position, encoded by the index 14, will then be located preferably within an angular range comprised between −3 degrees and +3 degrees (of the steering wheel angle) relative to the midpoint.

The midpoint will preferably correspond to the configuration according to which the power steering system 1 is substantially at a mid-stroke between its position of full steering to the left and its position of full steering to the right, the steering wheel 3 being in the central angular position, neither turned to the left, nor turned to the right, and/or, in an equivalent manner, the rack being in the central position, at a mid-stroke along its longitudinal direction of displacement, in the steering housing. Such a midpoint will then correspond to a « steering wheel zero », defined at the level of the steering mechanism itself.

Nonetheless, it will be noted that, in an alternative or complementary manner, but substantially equivalent in principle, it is possible to define a midpoint at the level of the vehicle, of the « straight line zero » type, as corresponding to the configuration in which the steered wheels 6, 7 present a zero steering angle, which maintains the vehicle on a straight-line path.

Moreover, the power steering system 1 being (manually) driven by means of a steering wheel 3, at most one index pulse T1, T2 is preferably generated per full revolution of the steering wheel 3.

Such an arrangement will enable identifying accurately, and by means of an index 14 with a simple and non-redundant structure, the indexed position, and then associating, without possible confusion, this information on the indexed position to the information on the angular position measured by means of another sensor, preferably associated herein to the shaft 11 of the assist motor 10.

According to one variant of implementation, it is possible to generate one, and only one, index pulse per full revolution of the steering wheel 3.

According to this variant, which is particularly well-adapted to a rotational index 14 technology tracking, for example, an indexed angular position (one per revolution) of the steering column 2, the index 14 may thus provide one single « top » per revolution of the steering wheel, that is to say per 360-degree mechanical rotation of the steering wheel 3.

As a complement, if the total stroke of the steering wheel 3 extends over several revolutions, and for example substantially over three revolutions, it may be possible to complete the index 14 by adding a revolution indicator (typically a revolution counter) thereto which enables distinguishing in which revolution the steering wheel is engaged, and for example determining whether it is the revolution corresponding to left turning, the revolution corresponding to right turning, or the central intermediate revolution.

It is then possible, during the tracking step (a), to consider the index pulse T1, T2 only if this is generated while the steering wheel 3 is in its central intermediate revolution, that it to say only when it is possible to affirm that, mechanically and by elimination, a pronounced turning situation is, excluded, so that the steering wheel is necessarily located in a revolution which allows said steering wheel to actually pass through the midpoint.

According to another variant of implementation, it may be possible to arrange the index 14 so that it delivers only but one single index pulse T1, T2 through the entire stroke of the movable steering member 2 (in a considered monotone travel direction), that is to say that the index 14 marks only but one angular position over the entire angular range of rotation of the steering wheel 3 (from the extreme position of full steering to the left up the opposite extreme position of full steering to the right).

Such a variant of implementation is particularly adapted to a translational sensor, allowing for example to encode a single position of the rack 5 with respect to the steering housing.

Furthermore, it physically guarantees the uniqueness of the indexed position, thus excluding any error related to a phase-shift (equivalent to one revolution of the steering wheel) when determining the reference position.

Advantageously, the method in accordance with the invention comprises, subsequently to the tracking step (a), a processing step (b), during which the index pulse T1, T2 is analyzed to detect a rising edge F1, F2 and/or a falling edge F3, F4, as is illustrated in FIG. 2.

Figure 3:
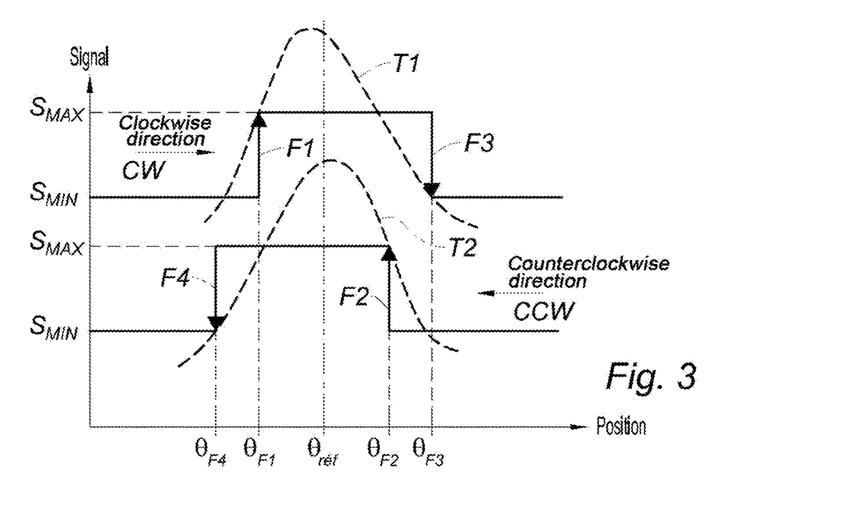
FIG. 3 illustrates, in a diagram representing a first and a second index pulses generated, respectively, in the clockwise direction and in the counterclockwise direction, the definition principle of the edge positions, as well as of a reference position, which herein corresponds to the common center of said index pulses.

The rising edge F1, F2 of an index pulse T1, T2 may be detected when the analog signal of said pulse T1, T2, derived from the index 14, crosses (along an upward slope) a predetermined high threshold $S_{max}$, as is illustrated in FIGS. 2 and 3.

Similarly, the falling edge of an index pulse T1, T2 may be detected when the analog signal of said pulse T1, T2, derived from the index 14, crosses (along a downward slope) a predetermined low threshold $S_{min}$, lower than the aforementioned high threshold $S_{max}$.

Thus, as each pulse T1, T2 may be characterized by a rising edge and by a falling edge (separated by a characteristic value of the pulse width), it is advantageously possible to convert (translate) each index pulse T1, T2 into a logic pulse signal (for example a Boolean-type binary signal), as is illustrated in FIGS. 2 and 3.

The method in accordance with the invention then comprises a characterization step (c) during which a value called « edge position » $\theta_{F1}$, $\theta_{F2}$, $\theta_{F3}$, $\theta_{F4}$ is associated to the rising or falling edge F1, F2, F3, F4, identified during the processing step (b), which value is representative of the position (and more particularly of the angular position) occupied by the movable steering member 2 when said edge F1, F2, F3, F4 occurs.

Conventionally and for convenience, regardless of the concerned movable steering member 2, the position of said steering member 2 will be preferably expressed in the form of an equivalent angular position, corresponding to the angular position that should be occupied by the steering wheel 3 in order to enable said member to be in the considered configuration.

As an indication, the width of either one of the index pulses (the width herein being of $\theta_{F3}-\theta_{F1}$ for the first index pulse T1) may be comprised between 20 degrees and 40 degrees, and for example substantially equal to 30 degrees.

The edge position $\theta_{F1}$, $\theta_{F2}$, $\theta_{F3}$, $\theta_{F4}$ which corresponds to each considered edge F1, F2, F3, F4 will be preferably measured by a second sensor 20, distinct from the index 14, and more preferably by a relative position sensor, typically a « resolver »-type inductive sensor, allowing to measure, from any freely selected origin, the different displacements of a steering member 2 whose variable position depends on, and is representative of, the orientation of the steering system 1.

Such a relative position sensor will allow determining the different successive positions of the steering member 2 relative to each other, a position of said steering member 2 being known relatively to another position previously occupied by said steering member 2, and this independently of any fixed origin.

In a particularly preferable manner, a («resolver»-type) sensor measuring the relative angular position of the shaft 11 of the assist motor 10 will be used as a second sensor 20.

Because of the mechanical coupling existing between the shaft 11 of the assist motor and the considered movable steering member, for instance the steering column 2, the position of said motor shaft 11 is representative, while considering the reduction ratio of the drive mechanism, of the position of said movable member 2, that is to say for instance, of the (relative) angular position of the steering column 2, and therefore of the (relative) angular position of the steering wheel 3 (and more generally of the relative modifications of the orientation of the steering system).

Advantageously, expressing the edge positions $\theta_{F1}$, $\theta_{F2}$, $\theta_{F3}$, $\theta_{F4}$ with reference to the shaft 11 of the assist motor 10 allows operating directly, at a lower cost, a relative angular position sensor which is already available because integrated to the electric assist motor 10, without the need for adding a specific sensor.

According to the invention, and as is illustrated in FIG. 3, the tracking (a), processing (b), and characterization (c) steps are repeated, on the one hand, for a first index pulse T1 which is generated when the movable steering member 2 crosses the indexed position in a first direction of displacement CW (herein, conventionally, the ClockWise direction, with preferred reference to acquiring angular positions), and on the other hand, for a second index pulse T2 which is generated when said movable steering member 2 crosses this same indexed position in a second direction of displacement CCW (herein, conventionally, the CounterClockWise direction, with preferred reference to acquiring angular positions), opposite to the first direction of displacement CW.

In this manner, are acquired, respectively, on the one hand, a first edge position $\theta_{F1}$, which corresponds to a first edge F1 generated in the first direction of displacement CW, and on the other hand, a second edge position $\theta_{F2}$, which corresponds to a second edge F2 which is generated in the second direction of displacement CCW and which is of the same rising or falling nature as the first edge F1.

By mere convention, it is possible to consider that the clockwise motion CW is associated to a steering operation to the right, whereas the counterclockwise motion CCW is associated to an opposite steering operation to the left (or conversely).

The method then comprises a step (d) of calculating a reference position $\theta_{ref}$, during which a reference position $\theta_{ref}$ of the power steering system 1 is calculated from the first edge position $\theta_{F1}$ and the second edge position $\theta_{F2}$, and more particularly from an average of the first edge position $\theta_{F1}$ and of the second edge position $\theta_{F2}$.

In other terms, the method according to the invention comprises:

a step of acquiring a first edge position (step which corresponds to a first execution of the tracking (a), processing (b), and characterization (c) steps), during which a first edge F1 (or respectively F3) is detected, namely a rising edge F1 or (respectively) a falling edge F3, which belongs to a first index pulse T1 generated when the movable steering member 2 crosses the indexed position in a first direction of displacement CW, and during which is acquired a first edge position $\theta_{F1}$ (respectively $\theta_{F3}$) which corresponds to a value representative of the position occupied by the movable steering member 2 when said first edge F1 (respectively F3) occurs, a step of acquiring a second edge position (which step corresponds to a second execution of the tracking (a), processing (b), and characterization (c) steps), during which a second edge F2 (or respectively F4) is detected, which is of the same rising or falling nature as the first edge F1 (respectively F3), and which belongs to a second index pulse T2 generated when the movable steering member 2 crosses the indexed position in a second direction of displacement CCW, opposite to the first direction of displacement CW, and during which a second edge position $\theta_{F2}$ (respectively ($\theta_{F4}$) is acquired which corresponds to a value representative of the position occupied by the movable steering member 2 when said second edge F2 (respectively F4) occurs, then a step (d) of calculating a reference position, during which a reference position $\theta_{ref}$ of the power steering system 1 is calculated from the first edge position $\theta_{F1}$ (respectively $\theta_{F3}$) and the second edge position $\theta_{F2}$ (respectively $\theta_{F4}$), and more particularly from an average of said edge positions.

Advantageously, combining (in this instance summing up so as to obtain an average) the information on the edge positions $\theta_{F1}$, $\theta_{F2}$ derived from edges which are of the same nature (that is to say two rising edges F1, F2, or, respectively, two falling edges F3, F4), but which are acquired in opposite directions of displacement CW, CCW, allows cancelling, by symmetrical compensation, the errors and drift phenomena that may individually affect each one of the first and second pulses T1, T2.

Thus, the reference position $\theta_{ref}$ may be defined very simply, but yet very accurately.

It will be noted that said reference position $\theta_{ref}$ is herein strictly comprised between the first edge position $\theta_{F1}$ and the second edge position $\theta_{F2}$, because of the use of an average, if any.

Once determined, said reference position $\theta_{ref}$ may be served to set the absolute origin, where appropriate, by adding to this reference position an offset-type corrective value learned during the factory calibration. The position measurements (via the second sensor 20, which herein measures relative positions) may then be performed starting from (with reference to) said absolute origin.

Preferably, according to one setting possibility, said absolute origin will correspond to the midpoint called «steering wheel zero» of the steering system 1, as mentioned hereinabove.

According to another setting possibility, well-adapted to the end vehicle, the absolute origin may correspond to the «straight line zero», that is to say to the configuration in which the steered wheels 6, 7 have a zero steering angle, so as to enable a displacement of the vehicle in a straight line (configuration which does not necessarily coincide exactly with «the steering wheel zero»).

Advantageously, and regardless of the definition chosen for setting the absolute origin, as soon as the measurements of relative positions (herein, of the shaft 11 of the assist motor 10) are (systematically) performed with reference to this absolute origin, they become, in practice, measurements of absolute positions, for instance measurements of the absolute angular position of the steering column 2, of the absolute angular position of the steering wheel 3, and more generally of the absolute orientation of the steering system (with respect to its midpoint).

Moreover, it will be noted that, in order to enable the execution of the method according to the invention, it is necessary to memorize the edges F1, F2, F3, F4 as well as the corresponding edge positions $\theta_{F1}$, $\theta_{F2}$, $\theta_{F3}$, $\theta_{F4}$, and to classify said edges (associated to their respective edge positions) according to the (rising or falling) nature of said edges, and according to the direction of displacement (direction of rotation) in which said edges have been acquired, and this until obtaining enough edges to carry out the calculation specified at step (d).

In a particularly preferable manner, for simplicity, rapidity, and symmetrical correction of errors, we will choose calculating an arithmetic mean of the edge positions (each edge position being weighted identically to the other).

Preferably, the reference position $\theta_{ref}$ may in particular be defined from an average of the first edge position $\theta_{F1}$ and of the second edge position $\theta_{F2}$.

Thus, it will be possible to define a reference position in a simple and rapid manner with only two edge positions corresponding to (only) one pair of edges F1, F2 of the same nature.

Still more preferably, the reference position $\theta_{ref}$ may be defined as (exactly) equal to the arithmetic mean of the first and second edge positions:

$$\theta_{ref} = \frac{1}{2} * (\theta_{F1} + \theta_{F2}).$$

In particular, this makes it possible to define the reference position $\theta_{ref}$ as the average center of the two considered index pulses T1, T2.

In particular, this will allow the method to rapidly converge, that is to say to rapidly identify a reliable reference position, as soon as the alternating operations of the steering wheel 3 by the driver have made it possible to acquire two opposite index pulses T1, T2.

According to another preferable variant of implementation of the method, a third edge position $\theta_{F3}$ is acquired, which corresponds to a value representative of the position occupied by the movable steering member 2 when occurs a third edge F3 (a falling edge in the figures) which belongs to the first index pulse T1 and which is of a nature opposite to the nature of the first edge F1, as well as a fourth edge position $\theta_{F4}$, which corresponds to a value representative of the position occupied by the movable steering member 2 when occurs a fourth edge F4 which belongs to the second pulse T2 and which is of a nature opposite to the nature of the second edge F2 and identical (herein falling) to the nature of the third edge F3.

During the calculation step (d), it is then possible to define the reference position $\theta_{ref}$ from an average of the first, second, third and fourth edge positions $\theta_{F1}$, $\theta_{F2}$, $\theta_{F3}$, $\theta_{F4}$, and preferably define said reference position $\theta_{ref}$ as equal to the arithmetic mean of the first, second, third and fourth edge positions:

$$\theta_{ref} = \frac{1}{4} * (\theta_{F1} + \theta_{F2} + \theta_{F3} + \theta_{F4}).$$

Such mode of obtaining the same will be advantageously more accurate than the previous mode consisting in using only two edges F1, F2, even though said mode may possibly require a little longer phase of acquiring the index pulse analog signals T1, T2.

This being so, it will be noted that, herein again, the acquisition of two opposite pulses T1, T2, corresponding to two alternating « swerving of the steering wheel 3 » in the vicinity of the indexed position (wherein said indexed position is in turn preferably close to the midpoint of the steering), is enough to obtain a convergence toward the reference position.

As indicated hereinabove, the power steering system 1 comprising an assist motor 10, the edge positions $\theta_{F1}$, $\theta_{F2}$, $\theta_{F3}$, $\theta_{F4}$ are preferably defined by the angular positions of the shaft 11 of the assist motor 10, in such a manner that these angular positions are measured when the considered edges F1, F2, F3, F4 (respectively) occur.

In other terms, during the characterization step (c), the (relative) angular position of the motor shaft 11 is measured at the moment when the considered edge F1, F2, F3, F4 occurs, and this relative angular position value is considered to be the edge position (all edge positions being thus expressed in the same reference frame of the assist motor 10).

Preferably, said angular positions are measured by means of a relative position sensor 20, such as a « resolver ».

Of course, the invention may relate to any method using the aforementioned method for determining the reference position, and in particular to a method for determining the absolute angular position of a steering wheel 3 equipping a power steering system 1 provided with an assist motor 10, said method comprising a pre-sequence homing phase, during which a reference position θref is determined according to a method in accordance with the invention, and, preferably by means of a corrective term obtained by factory calibration as described hereinabove, the origin of an angular reference frame is set from this reference position, angular reference frame wherein the operations of the steering wheel are performed, said method then comprising a position measuring phase during which the relative position of the shaft 11 of the assist motor 10 (or the position of any other movable steering member belonging to the kinematic linkage operated by the steering wheel 3, and whose position is therefore representative of the position of said steering wheel 3) is measured, in said angular reference frame, by means of a relative position sensor 20, preferably of the « resolver » type, so as to express the absolute position of the steering wheel.

The invention also concerns a data medium readable on a calculator and containing code elements of a computer program which makes it possible to implement a method according to any one of the variants of the invention when said medium is read by a calculator.

The invention also concerns, as such, a power steering system 1 which comprises at least one reference support, such as a steering housing, as well as at least one assist motor 10 and at least one steering member, such as a steering column 2, which is bidirectional, that is to say movably mounted relative to the support so as to be able to be displaced alternatively in a first direction of displacement CW and in an opposite second direction of displacement CCW, and which is coupled to the shaft 11 of the assist motor 10 so as to be able to perform the steering operations, said power steering system also comprising an index 14 which generates an index pulse T1, T2 at each passage of the steering member 2 by a predetermined indexed position, as well as a relative position sensor 20 allowing to measure the angular position of the shaft 11 of the assist motor 10.

According to the invention, said power steering system comprises an analysis unit 30 (typically an electronic calculator which may be integrated to the assist motor 10) which is structured or programmed to detect the rising F1, F2 and/or falling F3, F4 edges of the index pulses T1, T2, memorize the angular positions, called « edge positions » $\theta_{F1}$, $\theta_{F2}$, $\theta_{F3}$, $\theta_{F4}$, of the shaft 11 of the assist motor which correspond to said edges, classify the edges F1, F2, F3, F4 by nature, based on whether said edges are falling or rising, classifying said edges based on the clockwise CW or counterclockwise CCW direction of displacement, in which the index pulse T1, T2 to which each considered edge belongs has been generated, then calculate a reference position $\theta_{ref}$ based on two edge positions, and more particularly based on an average of two edge positions, associated to two edges F1, F2 (respectively F3, F4) of the same nature each derived respectively from a first index pulse T1 and from a second index pulse T2 which correspond to opposite directions of displacement CW, CCW of the steering member 2.

The invention also relates to an analysis unit 30 as such, and more generally to a power steering module (subset of the power steering system), such as an assist motor/controller set, which is intended to be integrated in a power steering system, and which contains such an onboard analysis unit 30.

Finally, the invention relates of course to a vehicle, and in particular a motor vehicle, equipped with a power steering system 1 according to the invention, which can advantageously control the orientation of the steered (and possibly drive) wheels 6, 7 of said vehicle.

Of course, the invention is not limited to the sole described variants, those skilled in the art being in particular capable of freely isolating or combining together either one of the aforementioned features, or to substitute them with equivalents thereof.

Thus, it will be noted that, in a general manner, using detecting two distinct index pulse edges, of the same (rising or falling) nature but corresponding to pulses generated by the crossing of the same indexed position, in a first direction CW then in an opposite second direction CCW, in order to calculate a reference position of a power steering system, may constitute an invention on its own, regardless of the information (in particular the information about position) derived from said edges, and regardless of the nature of the processing applied to this information (and in particular regardless of the nature of the calculation step (d), as long as the calculation step (d) allows determining the reference position from the information on the edges, in particular from the respective positions of each of the edges).

What is claimed is:

1. A method for defining a reference position of a power steering system, said power steering system comprising at least one movable steering member whose position varies according to the orientation given to the steering system, said method comprising:
    a tracking step (a), during which an index pulse is generated when the movable steering member passes by a predetermined indexed position;
    a processing step (b), during which the index pulse is analyzed in order to detect a rising edge and/or a falling edge therein;
    a characterization step (c) during which an edge position, which is a value representative of the position occupied by the movable steering member when said edge is produced, is associated to the rising or falling edge identified during the processing step (b);
    wherein
    the tracking (a), processing (b), and characterization (c) steps are repeated, on the one hand, for a first index pulse which is generated when the movable steering member crosses the indexed position in a first direction of displacement, and on the other hand, for a second index pulse which is generated when said movable steering member crosses this same indexed position in a second direction of displacement, opposite to the first direction of displacement, so as to acquire, respectively, on the one hand, a first edge position, which corresponds to a first edge generated in the first direction of displacement, and on the other hand, a second edge position, which corresponds to a second edge which is generated in the second direction of displacement and which is of the same rising or falling nature as the first edge;
    and wherein said method includes a step (d) of calculating a reference position of the power steering system from the first edge position and from the second edge position.

2. The method according to claim 1, wherein the reference position is defined from an average of the first edge position and of the second edge position.

3. The method according to claim 1, wherein a third edge position is acquired, which corresponds to a value representative of the position occupied by the movable steering member when occurs a third edge which belongs to the first index pulse and which is of a nature opposite to that of the first edge, as well as a fourth edge position, which corresponds to a value representative of the position occupied by the movable steering member when occurs a fourth edge which belongs to the second pulse and which is of a nature opposite to that of the second edge and identical to that of the third edge, and wherein, during the calculation step (d), the reference position is defined from an average of the first, second, third and fourth edge positions.

4. The method according to claim 1, wherein, the power steering system comprising an assist motor, the edge positions are defined by the angular positions of the shaft of the assist motor, such that these angular positions are measured when the considered edges occur.

5. The method according to claim 1, wherein the movable steering member is constituted by the steering column which carries the steering wheel, and wherein an index pulse is generated when said steering column passes by a predetermined indexed angular position.

6. The method according to claim 1, wherein, the power steering being driven by a steering wheel, at most one index pulse is generated per full revolution of the steering wheel.

7. The method according to claim 1, wherein the index pulse is an analog pulse.

8. A method for determining the absolute angular position of a steering wheel equipping a power steering system provided with an assist motor, said method comprising a pre-sequence homing phase, during which a reference position is determined according to a method in accordance with claim 1, and from this reference position is set the origin of an angular reference frame in which the operations of the steering wheel are performed, said method then comprising a position measuring phase during which the relative position of the shaft of the assist motor is measured, in said angular reference frame, by a relative position sensor, so as to express the absolute position of the steering wheel.

9. A data medium readable on a calculator and containing code elements of a computer program allowing to implement a method according to claim 1 when said medium is read by a calculator.

10. A power steering system comprising:
    at least one reference support;
    at least one assist motor;
    at least one steering member, which is movably mounted relative to the support so as to be able to be displaced alternatively in a first direction of displacement and in an opposite second direction of displacement, and which is coupled to a shaft of the assist motor so as to be able to perform steering operations;
    an index sensor which generates an index pulse at each passage of the steering member by a predetermined indexed position;

a relative position sensor allowing to measure an angular position of the shaft of the assist motor; and a structured or programmed analysis unit that detects rising and/or falling edges of the index pulses, memorizes the angular positions of the shaft of the assist motor which correspond to said edges, classifies the edges by nature, based on whether said edges are falling or rising, classifies said edges based on the clockwise or counterclockwise direction of displacement, in which the index pulse to which each considered edge belongs has been generated, then calculates a reference position based on two edge positions associated to two edges of the same nature each derived respectively from a first index pulse and from a second index pulse which correspond to opposite directions of displacement of the steering member.

\* \* \* \* \*